Sept. 12, 1961 D. DURHAM 2,999,622
FISHING ROD HOLDERS
Filed Aug. 11, 1959
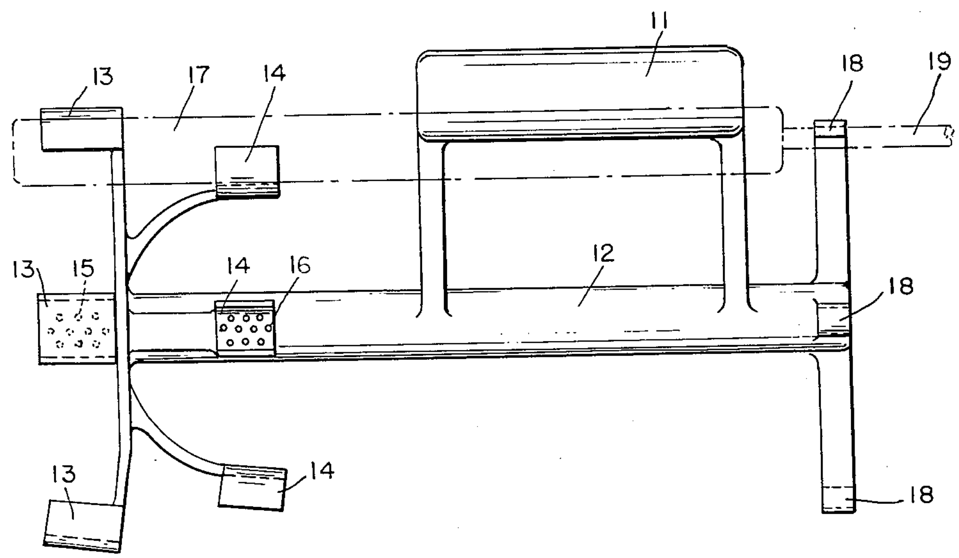
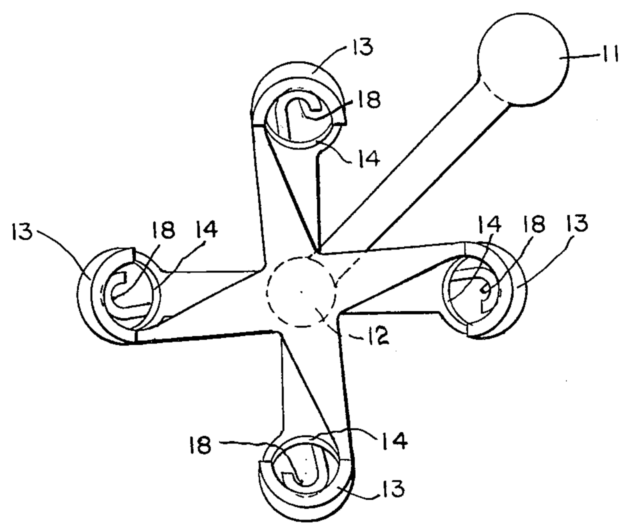
INVENTOR.
DELBERT DURHAM
BY H. C. Kavel
ATTORNEY.

United States Patent Office 2,999,622

Patented Sept. 12, 1961

1

2,999,622

FISHING ROD HOLDERS

Delbert Durham, 2500 Shanmoor Ave., Norwood, Ohio

Filed Aug. 11, 1959, Ser. No. 833,067

1 Claim. (Cl. 224—45)

This invention relates to a fishing rod holder. Fishermen usually carry several fishing rods and in moving to the fishing location often have difficulty in carrying the rods and preventing the lines from tangling with each other.

This improvement provides a holder in which a plurality of fishing rods can be held by the handles and the device has a hand grip whereby a plurality of rods can be easily carried with one hand without the lines becoming entangled.

The object of my invention is to provide a fishing rod holder having a plurality of fishing rod grips for easy engagement of the rods in the holder and means for holding the rods under tension to permit easy carrying of the rods.

A further object is to provide the holder with three point engaging supports and a handle for carrying the device.

My invention will be further readily understood from the following description and claim, and from the drawing, in which latter:

FIG. 1 is a side view of my improved holder.

FIG. 2 is an end view of the same.

My improved holder comprises a hand grip 11 being an integral part of a shank 12. One end of the shank is provided with extending engaging hooks 13 and forward supporting concave members 14. The inner surfaces of the hooks 13 and members 14 are provided with projections 15 and 16 to form a non-slip surface for engagement with the handle 17 of a fishing rod. The other end of the shank 12 has extending hooks 18 for engagement of the rod 19 of the fishing rod.

The stems of the hooks 13 are resilient and bent, so as to put the rod-engaging portions of the hooks 13 normally out of axial alignment with the rod-engaging portions of supports 14 and hooks 18. The hooks 13 and supports 14 are axially spaced. When a fishing rod is

2 placed between a hook 13 and support 14 and is engaged under hook 18, it will cause the rod-engaging portion of the hook 13 to be moved into axial alignment with the rod-engaging portions of the support 14 and hook 18, thereby straightening the stem of the hook 13 and putting it under yielding tension. This will yieldingly force the rod against, and retain it between, the oppositely directed rod-engaging surfaces of the support 14 and the hook 18.

With my improved holder, a plurality of rods can be carried in one hand without any of the lines becoming entangled.

Having thus fully described my invention, what I claim as new and desire to secure by Letters Patent, is:

A fishing rod holder comprising a handle, a shank parallel to said handle and attached thereto, axially spaced hooks and supports with opposed semi-cylindrical rod-engaging surfaces extending outwardly from said shank at one end thereof, hooks axially aligned with said first named hooks extending outwardly from said shank at the other end thereof, the stems of said first named hooks being resilient and bent to keep the rod-engaging surfaces of said first named hooks normally out of axial alignment with those of the last named hooks and those of the supports, whereby, when fishing rods are placed between said first named hooks and said supports and are engaged under said last named hooks, the rod-engaging surfaces of said first named hooks will be in axial alignment with the rod engaging surfaces of the last named hooks and of the supports, the resilient stems of the first named hooks will be straight and under tension and yieldingly retaining the fishing rods between the hooks and the supports.

References Cited in the file of this patent

UNITED STATES PATENTS

| | | |
|---|---|---|
| 699,391 | Johnson | May 6, 1902 |
| 908,903 | Thornton | Jan. 5, 1909 |
| 1,418,093 | Parmater | May 30, 1922 |
| 1,717,959 | Cauffman | June 18, 1929 |
| 2,204,692 | Parisio | June 18, 1940 |
| 2,430,112 | Hamre | Nov. 4, 1947 |
| 2,519,612 | Tuttle | Aug. 22, 1950 |